UNITED STATES PATENT OFFICE.

BOTHO SCHWERIN, OF FRANKFORT-ON-THE-MAIN, GERMANY, ASSIGNOR TO GESELLSCHAFT FÜR ELEKTRO-OSMOSE M-B-H, OF FRANKFORT-ON-THE-MAIN, GERMANY, A CORPORATION.

METHOD FOR PRODUCING METAL ADSORPTIONS.

1,098,176. Specification of Letters Patent. Patented May 26, 1914.

No Drawing. Application filed January 4, 1913. Serial No. 740,259.

*To all whom it may concern:*

Be it known that I, BOTHO SCHWERIN, a subject of the German Emperor, and residing at Frankfort-on-the-Main, Germany, have invented certain new and useful Improvements in Methods for Producing Metal Adsorptions, of which the following is a specification.

This invention relates to a method for producing metal adsorptions (that is to say metals adsorbed by some other substance) and consists in causing colloidal suspensions to adsorb the metal while the latter is in a colloidal condition. As suspended material suitable for adsorbing the metal and acting as carrier therefor may be named finely subdivided carbon, kaolin, amorphous silicic acid or the like, and generally all substances which have the property when in a finely subdivided state of adsorbing colloidal metals.

The invention is adapted for the production of contact substances, and for the manufacture of therapeutic or pharmaceutical preparations. It will be further explained with reference to some examples.

Finely subdivided substances of the aforesaid kind are brought into the sol-state under suitable conditions in water or in another appropriate liquid. Into this sol-suspension is introduced the required proportion of metal in the form of a solution, for insance a solution of a salt of gold, silver or platinum, and then this solution is subjected to one or other of the many methods of reduction which are suitable for obtaining a colloidal solution of the metal. For instance, when a gold adsorption is to be made, sodium or potassium carbonate may be added and reduction may be effected by means of formaldehyde. The gold in the colloidal condition is adsorbed by the very fine particles of the carrier and forms a violet or blue suspension accordingly as one or other of the known reducing agents has been used. This suspension is filtered and the filtrate will be found to be completely clear. The metal is held adsorbed, remarkably firmly, by its carrier. In the case of gold adsorbed by carborundum for instance, the gold adsorption may be boiled with acids (except aqua regia) or alkalis without dissolution of the adsorption. The precipitation of platinum on asbestos is a known operation; the product, however, is by no means so active a substance as that which can be produced in accordance with this invention. The metal cannot be in so active a condition as when it is not only adsorbed by a colloid, but is itself used in a truly colloidal form. Moreover, the present invention produces bodies of greater stability than has hitherto been attainable.

Metal adsorptions made in accordance with the invention are so stable that even when heated nearly to the melting point of the metal, the colloidal nature of the latter is not lost. This statement can be confirmed by osmotic methods, the application of which to the metal adsorption which has been heated several times serves to separate the metal in colloidal solution from the burnt substance in a very finely subdivided condition. The proportion of metal adsorbed depends on the surface and the potential of the particles. Since the surface of the suspended particles increases very much as the degree of their dispersion increases the proportion of metal may be very considerable.

The substances produced in accordance with this invention may be used in burnt or unburnt condition as contact substances, or in the form of powder as catalysts.

Another kind of application is shown from the following considerations:—For therapeutic and pharmaceutical purposes are used certain colloidal solutions, for instance those of mercury. Preparations have also been made in which for example colloidal silver is made stable by a protective colloid, such as albumen (collargol). The use of albumen has, however, certain disadvantages. If undecomposable, finely subdivided substances, which may if necessary be purified by electro-osmose and therefore be pure, are used, such materials may be caused to adsorb colloidal metals in accordance with this invention and remarkably active substances are thus obtained without the disadvantages appertaining to the use of albumen. Amorphous silicic acid is an example of such a substance; this material when used alone or mixed with other substances displays remarkable therapeutic properties. By the present invention it is possible to adsorb by purified amorphous electrically active silicic acid, colloidal metals and in particular noble metals, and the preparations thus obtained have the advantage that the basis is an undecomposable and harmless substance, which may be completely freed from all harmful admixtures by electro-osmotic purification. Hydrated alumina has like properties. The proportion of the colloidal adsorption can be most accurately determined; the materials are permanent for an unlimited time and undergo no kind of decomposition. Since, according to the present invention it is possible to produce the preparations in the form of powder, the methods of dry treatment which have lately found application for medical purposes can be used with success and the quantity applied may be adjusted very finely. The possibility of adsorbing liquids and semisolid substances, and also in therapeutic application the tendency to draw out secretions, is in no way influenced by the pressure of the metal in the colloid.

What I claim is:

1. The method of producing metal adsorptions consisting in bringing a metal into the colloidal state when in the presence of a colloidal suspension.

2. As an article of manufacture, adsorptions comprising colloids upon which have been adsorbed colloidal metals.

In testimony whereof I affix my signature in presence of two witnesses.

BOTHO SCHWERIN.

Witnesses:
JEAN GRUND,
CARL GRUND.